United States Patent [19]

Durinck et al.

[11] Patent Number: 5,205,494
[45] Date of Patent: Apr. 27, 1993

[54] GRINDING PROCESS AND MILL FOR CARRYING OUT THIS PROCESS

[75] Inventors: Rene Durinck, Villeneuve d'Ascq; Alain Cordonnier; Bernard Boussekey, both of Lille; Yves Verbaere, Salomé, all of France

[73] Assignee: FCB, Montreuil Cedex, France

[21] Appl. No.: 790,666

[22] Filed: Nov. 8, 1991

[30] Foreign Application Priority Data

Nov. 12, 1990 [FR] France ............... 90 14004
Aug. 1, 1991 [FR] France ............... 91 09788

[51] Int. Cl.⁵ .............................. B02C 4/40
[52] U.S. Cl. ........................... 241/30; 241/119; 241/228; 241/231
[58] Field of Search ............... 241/30, 116, 119, 121, 241/122, 228, 231

[56] References Cited

U.S. PATENT DOCUMENTS

| | | | |
|---|---|---|---|
| 2,282,887 | 5/1942 | Roberts | 241/228 |
| 2,748,667 | 6/1956 | Grieb et al. | 241/228 |
| 2,875,955 | 3/1959 | Wendshuh | 241/228 |
| 4,373,674 | 2/1983 | Barrera et al. | 241/15 |
| 4,527,748 | 7/1985 | Catani | 241/57 |

FOREIGN PATENT DOCUMENTS

| | | | |
|---|---|---|---|
| 205481 | 1/1909 | Fed. Rep. of Germany | 241/228 |
| 3705050 | 9/1988 | Fed. Rep. of Germany | 241/231 |

Primary Examiner—Mark Rosenbaum
Assistant Examiner—John M. Husar
Attorney, Agent, or Firm—Collard & Roe

[57] ABSTRACT

The purpose of the invention is a process and a machine for the fine grinding of materials such as cement clinker. To improve the energy efficiency of the operation, by performing a systematic grinding, without resorting to excessively high pressures or excessively substantial recycling rates, there is used a mill composed of a rotating path and a roller capable of rolling on the path, exerting on the material by means of the roller an average pressure between 10 and 40 MPa and, on each turn of the path, the material is moved transversely on the latter over a distance which is a fraction of the width of the path.

13 Claims, 7 Drawing Sheets

GRINDING PROCESS AND MILL FOR CARRYING OUT THIS PROCESS

This invention has as its purpose a process for fine grinding of materials such as the raw materials for the production of cement, clinker, certain ores, etc. . . . For this operation, tubular ball mills generally are used. The edge mills are suitable for the simultaneous grinding and drying of the raw materials, but not for the grinding of clinker, for they do not make it possible to obtain cement of adequate quality. The cylinder presses are used essentially in pre-grinding of clinker.

Ball mills have very poor energy efficiency, in particular because they do not make it possible to carry out a systematic grinding, the feed of the material in the grinder and the action of the balls on the material being uncertain.

The edge mills have a better grinding efficiency. Nonetheless, in order to obtain the desired fineness, the material must be passed beneath the wheels many times. For such reason, these machines are equipped with several wheels, balls or runners and a recycling of products generally exceeding ten times the nominal flow is produced. These machines which include a multiplicity of grinding mechanisms are heavy and costly, and the recirculation of a large quantity of material, generally by pneumatic means, consumes a significant amount of energy which to a great extent cancels out the energy gain in grinding. The swinging vertical pebble mills and horizontal ring mills present the same disadvantages as the wheel mills.

The cylinder presses, in which the material to be ground is subjected to an average pressure in excess of 50 MPa in a single throughput, yield a pre-ground and agglomerated product and, in order to obtain the product of the desired fineness, the pre-ground material must undergo further grinding in another machine such as a ball mill. In these machines, the agglomeration of the material resulting from the strong pressures applied consumes a portion of the energy as pure waste while, because of the very high grinding pressures, the active mechanisms, in particular the bearings and the cylinder coatings, are subject to very substantial mechanical constraints, requiring costly maintenance and frequent repairs. Finally, their field of application is limited to the grinding of fragile materials, with very little moisture and not too abrasive.

The intent of this invention is to propose a process and a mill assuring a systematic grinding making it possible to increase the energy efficiency by reducing the energy required to recycle the material and to contain maintenance costs and the risks of shutdown for repair through the use of moderate pressures.

This invention has as its purpose a grinding process consisting in forming a layer of a material to be ground on a circular path and exerting a pressure on this layer by means of a roller capable of rolling on the path, characterized in that the average pressure exerted by the roller on the material during grinding is between 10 and 40 MPa, and in that the transverse movement of the material, from one side of the path to the other is controlled so that the material passes between the roller and the grinding path several times before leaving the latter.

The average pressure exerted by the roller on the material is the quotient of the total force (weight + external forces) applied to the roller by the surface of the layer of material on which the pressure of the roller is exerted.

The invention also has as its purpose a mill comprising a circular path and at least one roller capable of rolling on the path, characterized in that it includes means for applying the roller to the grinding path with a force such that the roller exerts on the layer of materials covering the path an average pressure between 10 and 40 MPa, and in that a device is provided to move the material transversely on the grinding path, over a distance equal to only a fraction of the width of the path on each turn of the latter.

Advantageously, the mill will be composed of at least one rotating ring with a horizontal axis, at least one roller placed inside said ring so as to be able to roll on the path constituted by the inner surface of the ring, and the means to drive the ring in rotation at a velocity higher than the critical velocity.

Tests on grinding of clinker performed in a pilot plant equipped with a mill of this type demonstrated that the quality of the final product was comparable to that of the cement obtained with a ball mill; the granulometric curves are very close and the tests on mortar and concrete yield equal or superior results. Furthermore, the specific consumption is about 40% below that of a ball mill and close to that of a cylinder press.

In this type of mill, the feed device for the material advantageously may be made up of a set of paddles the width of which, measured in a parallel direction to the axis of the ring, is a fraction of the width of the path, the planes of which form an angle with a plane perpendicular to the axis of the ring and which are arranged so as to penetrate into the layer of material held on the path by centrifugal force when the ring is in rotation.

The device also may be made up of a scraper extending in a parallel direction to the axis of the ring and penetrating into the layer of the materials held on the grinding path by centrifugal force to separate it therefrom, and of deflector plates arranged beneath the scraper and positioned so as to intercept the materials separated by the scraper and divert them toward the mill outlet. Each deflector plate will be installed so as to be able to pivot around an axis, preferably vertical, and will be inclined, for example 45°, or so as to divert the materials toward the axis of the ring, or on the contrary, so as to be able to conduct the materials back toward the grinding path. Control mechanisms will make it possible to change the positioning of the deflector plates in order to adjust the feed velocity of the materials on the grinding path. By causing the materials to rain from the ring onto the deflector plates, this step-by-step feed device for the materials permits the pneumatic removal of the fine particles and the drying of the materials by means of a current of air, which may be warm, circulating inside the mill.

The ring might be fastened to a coaxial cylindrical sleeve forming, above the ring, an intake chamber for the material to be ground which is centrifuged there, and the feed device for the material will be designed to conduct the material from the intake chamber onto the grinding path of the ring.

Two rollers might be provided angularly set in relation to one another inside the ring and a feed device for the material connected to each roller.

There also might be provided, inside a cylindrical sleeve with a horizontal axis, several rings set axially in relation to one another, and inside each ring one or several roller(s).

In accordance with another characteristic of the invention, the diameter of the roller and/or of the grinding path changes progressively or by degrees from one end of the roller to the other and/or from one side of the path to the other, respectively, so that the distance between the roller and the path decreases progressively or by degrees from the intake toward the outlet of the grinding zone. For example, a cylindrical path and a roller made up of two or more parts of different diameters or a roller in the shape of a truncated cone, the end of the roller with the small diameter being turned toward the mill intake, may be used. A path with various diameters or in the shape of a truncated cone working in conjunction with a cylindrical roller, in the shape of a truncated cone or in tiers, also may be used. A particularly advantageous arrangement consists in setting up the path and the roller so that the relationship of the diameters of the path and the roller is the same in all the sections in order that relative slipping does not occur between the paired surfaces. The path and the roller will have the shape of a truncated cone or will comprise several cylindrical portions with the portion having the largest diameter turned toward the intake of the mill.

This characteristic combined with the use of the step-by-step feed device for the materials makes it possible to achieve a systematic grinding under optimal conditions for products with heterogeneous granulometry.

Other characteristics of the invention will appear in the reading of the description which follows and refers to the accompanying drawings which show, by way of non-restrictive example, two forms of implementation of the invention and in which.

Figure 1:
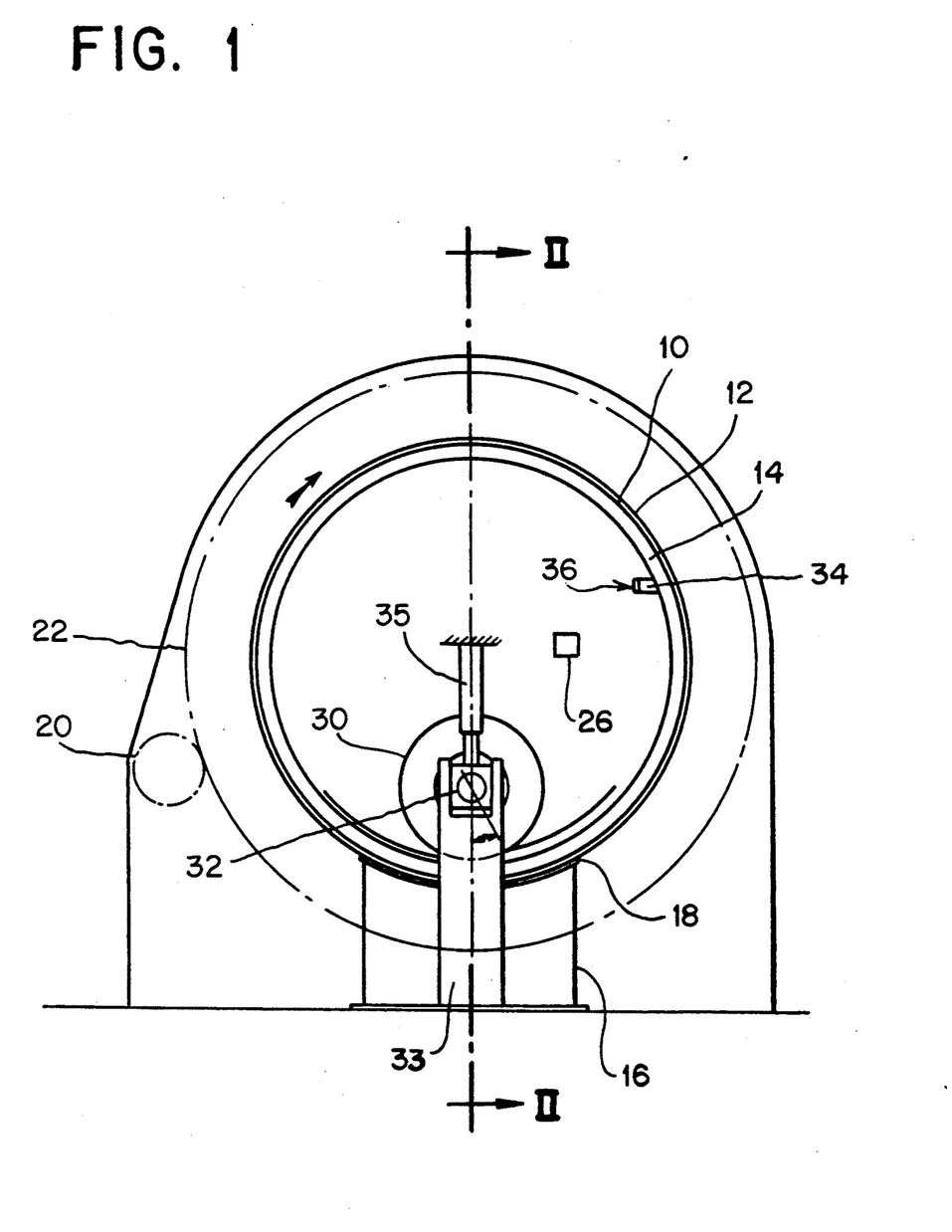
FIG. 1 is a view in elevation of a ring mill in accordance with the invention, the housing on the outlet side having been removed to show the interior of the ring.
Figure 2:
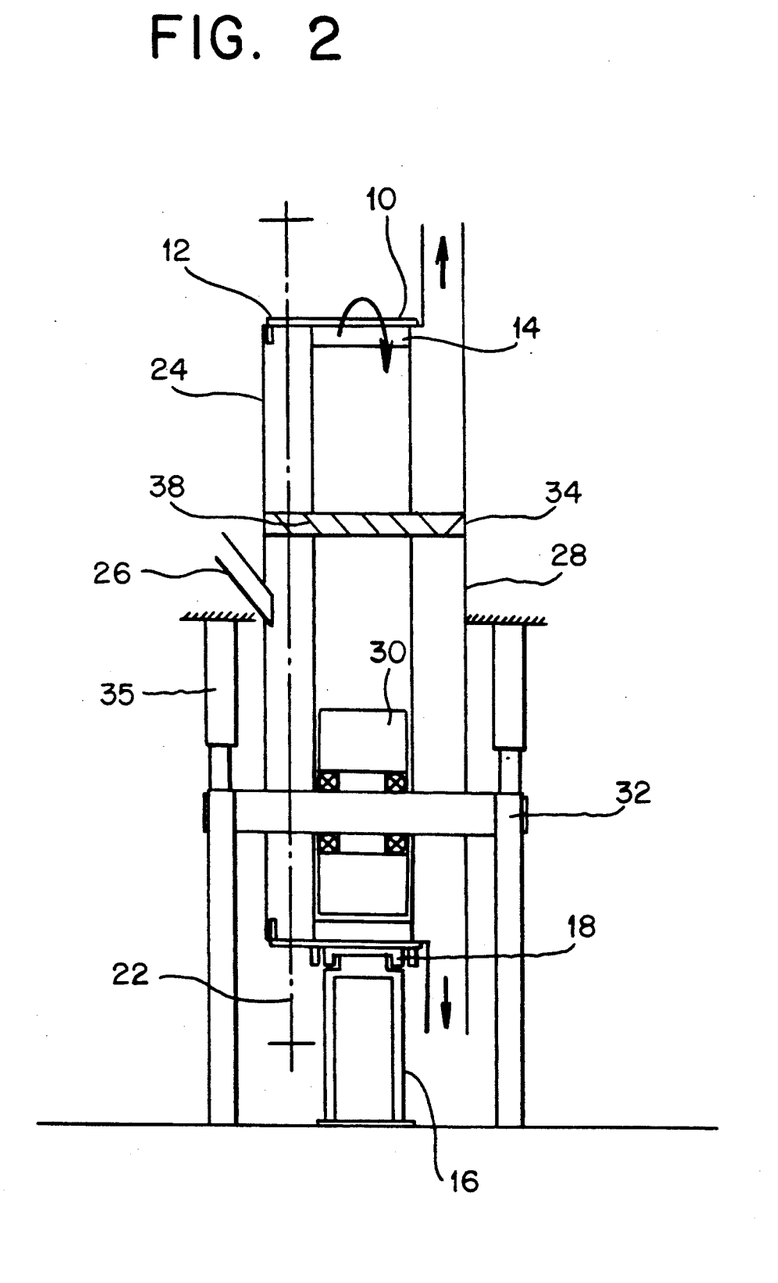
FIG. 2 is a section in the direction II—II of the mill of FIG. 1.

The mill represented in FIGS. 1 and 2 comprises a rotating body 10 made up of a short cylindrical sleeve 12 with a horizontal axis and a concentric ring 14 fastened to the inside of the sleeve and constituting a grinding path.

The body 10 is supported by a frame 16 on which it rests by means of a bearing 18 located under the ring 14, which assumes the shape of the sleeve and permits rotation around its axis. A system of lubrication, not represented, when the body 10 is driven in rotation, supplies oil under pressure to the bearing 18 so as to maintain, by hydrodynamic action, a film of oil between the sliding surfaces of the bearing and the sleeve.

The body 10 is driven in rotation by a moto-reducer set, not represented, the outlet shaft of which bears a pinion 20 engaged with a toothed rim 22 fastened to the sleeve.

One of the ends of the sleeve is closed by a fixed side 24 cut through with an opening to which is connected a feed spout 26. The volume contained between the side 24 and the ring constitutes an intake chamber for the material to be ground which is centrifuged and conducted to the interior of the ring by a device described below. The other end opens into a housing 28 which is connected, in its upper portion, to a pneumatic circuit permitting the removal of the fine fraction of the ground products, and the base of which collects the other fraction of the ground products and permits their removal through a sieve not represented. Pneumatic removal might be assured by the cooling air or by the warm drying gases, when the material to be ground contains moisture, sweeping the inside of the sleeve. The two fractions of ground products are conducted to the separators where the finished product, having the desired granulometry, is separated from the riddlings which are recycled.

A roller 30 is installed on the interior of the ring 14, above the frame 16 and rolls on the inside surface of the ring when the body 10 is driven in rotation. The roller 30 is installed loosely on a shaft 32 parallel to the axis of the ring 14.

The ends of the shaft 32, which are on the outside of the sleeve, are guided by vertical slides 33 integral with the frame 16 or by the levers installed on this frame. Springs or jacks 35 connected with a hydropneumatic system make it possible to exert on the ends of the shaft forces which are transmitted to the roller and press the latter on the ring 14. Traditional means are provided to adjust the forces exerted by the springs or the jacks.

The roller may have a cylindrical or slightly convex (cambered) exterior surface. The surface of the path may be cylindrical or slightly concave.

A device 34 designed to assure the feed of the products, from one end to the other of the sleeve 12, is provided in the upper half of the body 10, on the descending portion of the circular trajectory followed by the ground products held on the path 14 by centrifugal force. This device is composed of a fixed cross-piece 36 which extends from the side 24 to the base of the housing 28 and which bears throughout its length paddles 38 regularly spaced in relation to one another and the planes of which are parallel among themselves and form an angle α with a plane perpendicular to the axis of the sleeve. The paddle end is at a short distance from the surface of the ring 14, so that the paddles penetrate into the layer of ground products and, because of their slope, assure the movement of the material in a parallel direction to the axis of the sleeve, from one side of the path to the other. In the same manner, the paddles here and there on the ring make it possible to conduct the products to be ground onto the path and to remove the ground products.

The distance, measured in a parallel direction to the axis of the ring, between the upper and the lower side of each paddle is a fraction of the width of the grinding path, so that, on each turn of the ring, the material which is on the path is moved by the paddles at a pace equal to this fraction of the width of the path; thus it passes several times between the roller and the ring and undergoes several grindings before being driven from the path and removed.

The paddles 38 are installed on the cross-piece 36 so that it is possible to change their positioning (angle α) and, consequently, to adjust the length of time the material remains on the grinding path 14. The means permitting this adjustment, which may be remote-controlled, have not been represented.

Figure 3:
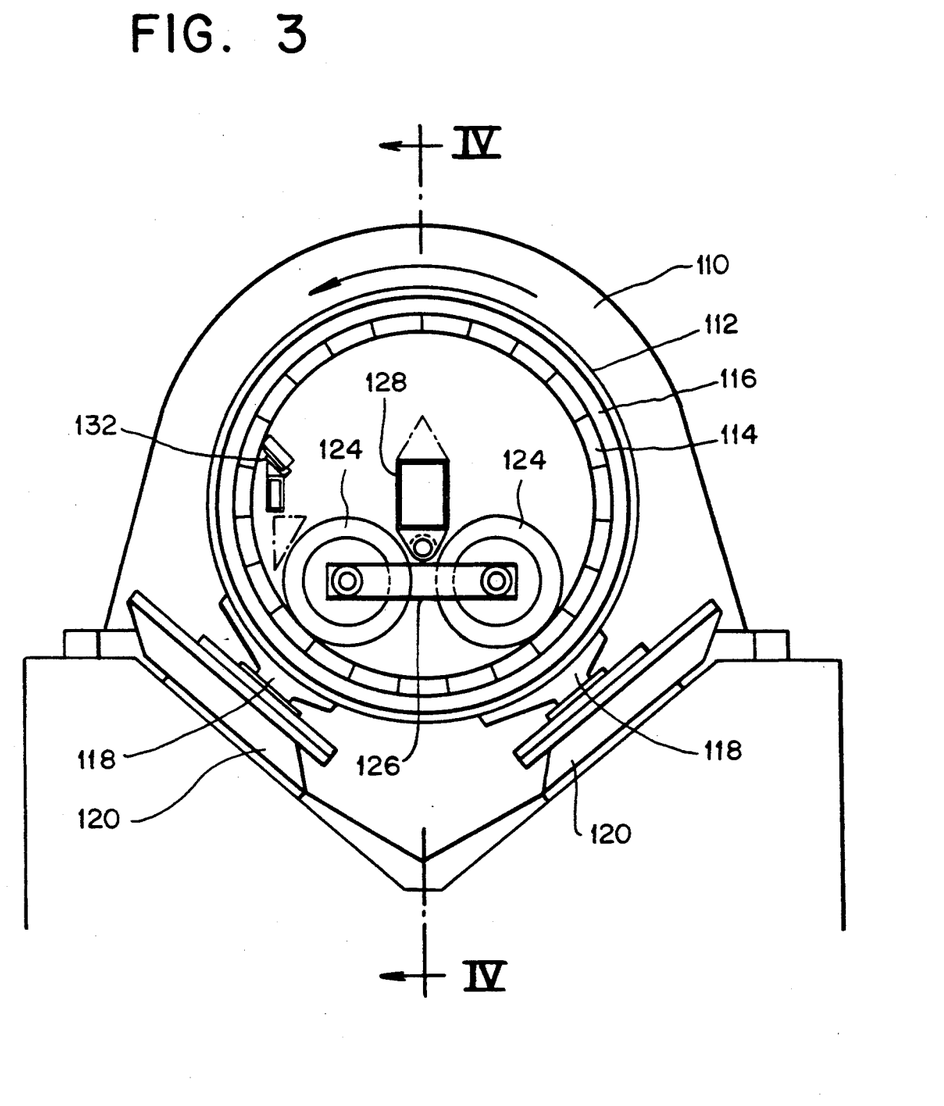
FIG. 3 is a view in elevation of another mill in accordance with the invention.
Figure 4:
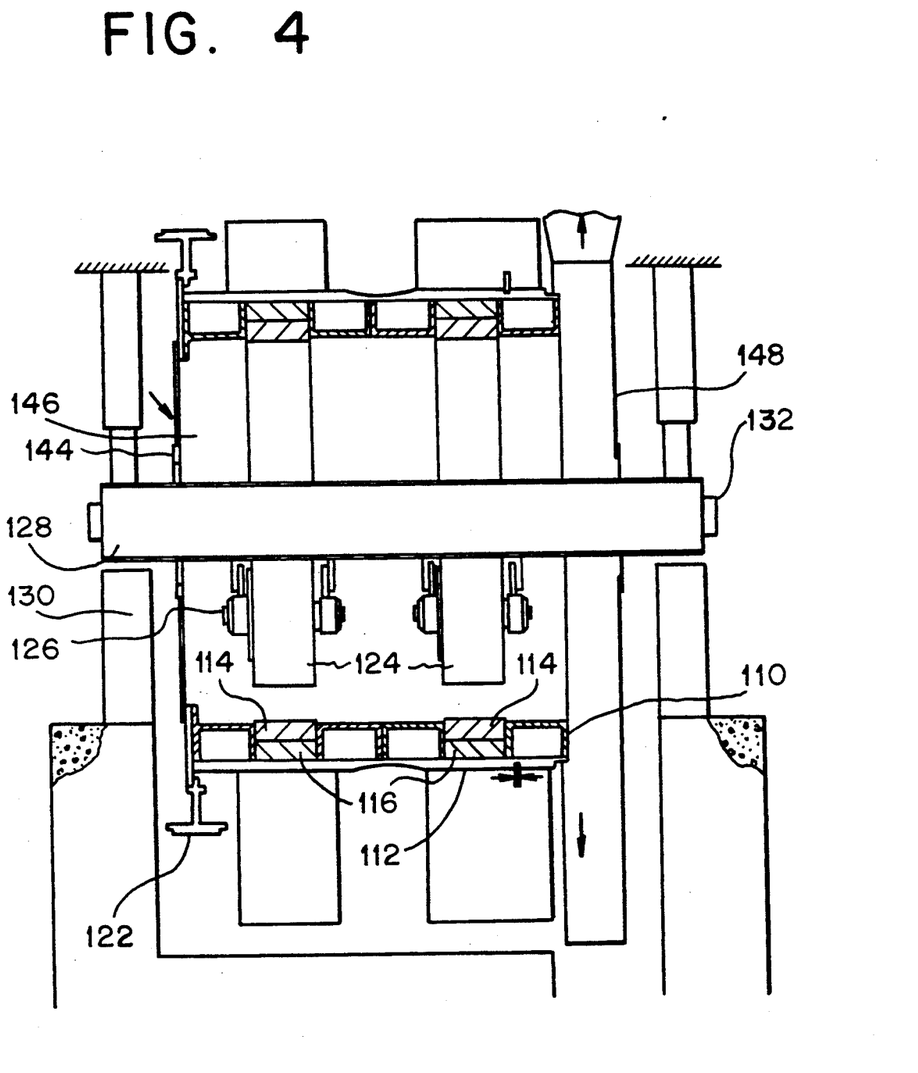
FIG. 4 is a section in the direction IV—IV of the mill of FIG. 3.

In a form of implementation represented in FIGS. 3 and 4, the body 110 of the mill is composed of a cylindrical sleeve 112 inside of which are mounted two rings 116 covered with wearplates 114 constituting two grinding paths. The body 110 is supported by four shoes 118, two under each ring, resting by means of joints on the frames 120. These shoes are lubricated in the same manner as the bearing 18 of the first form of implementation described above. A toothed rim 122 fastened on the sleeve makes it possible to drive the mill in rotation.

Four rollers 124 are installed inside the sleeve so as to be able to roll on the paths 114, when the mill is driven in rotation. Each roller is located above a shoe 118. The rollers are mounted loosely on their axes, and the axes of the rollers of each pair which roll on the same path are fastened onto a compensation bar 126 connected to a beam 128 arranged longitudinally inside the sleeve and traversing it through and through. The ends of the beam 128 are guided by slides integral with frames 130 or by levers mounted on these frames. Springs or jacks connected to a hydropneumatic system acting on the ends of the beam or on the levers make it possible to press the rollers on the paths. As a variant, the springs or jacks might be placed between the rollers and the compensation bars or between the latter and the beam 128.

A device 132, of the same design as the device 34, and provided with paddles intended to assure the feed of the material from one end of the mill to the other, is arranged in the upper half of the mill.

The intake end of the sleeve is closed by a fixed side 144 cut through with an opening for the passage of the feed spout 146 and its other end opens into a housing 148 through which the ground products are removed.

As a variant, the mill might be equipped with two feed spouts and two devices for feed of the material placed above each roller, with reference to the direction of rotation of the mill.

Instead of being supported by a bearing or by shoes, the rotating body of the mill might be supported by runners. The roller or rollers might be driven in rotation, for example, by means of a Cardan extension, the ring or rings then being driven by friction.

The runners might be diametrically opposed, their axes being located in the same vertical plane.

The mill represented in FIGS. 5 to 8 is composed of a drum 210, with a horizontal axis, which is supported by two shoes 212 permitting its rotation around its axis; these shoes might be replaced by a bearing or runners. The drum is driven in rotation by traditional means, not represented, for example by a moto-reducer set the outlet shaft of which bears a pinion engaged with a toothed rim mounted on the sleeve.

Figure 5:
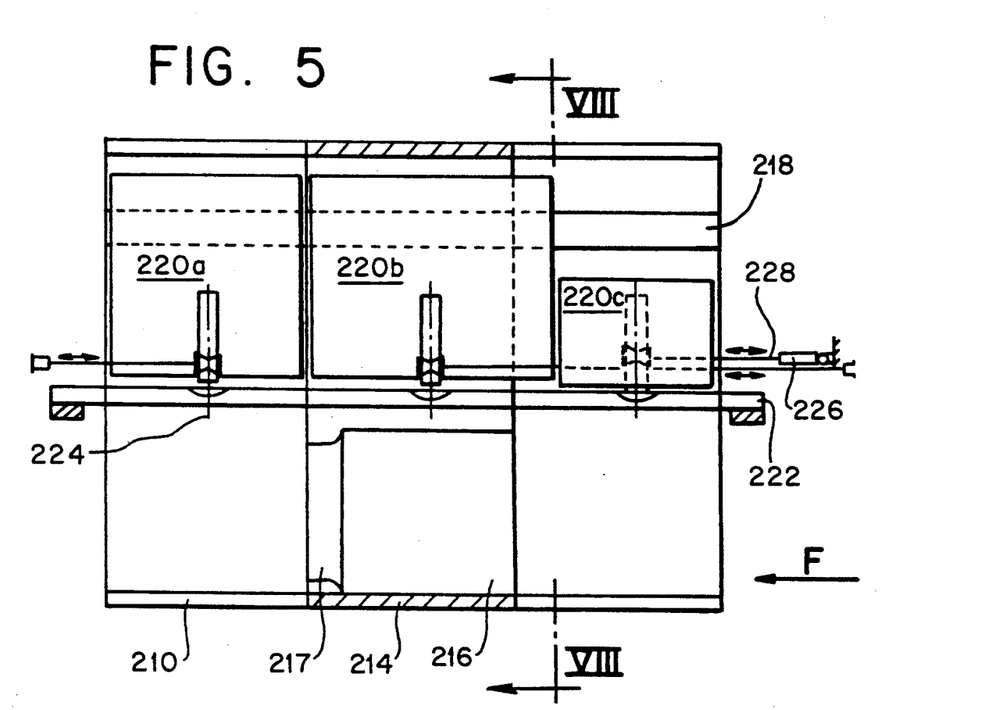
FIG. 5 is a schematic representation, in vertical section, of a mill in accordance with the invention, equipped with a roller arranged in tiers and a feed device for the material with deflector plates.

The drum is composed of a sleeve covered on the inside with wear-plates which, in the central portion, form a ring-shaped grinding path 214. The interior of the drum thus is divided into a feed zone 211, a grinding zone 213 and a removal zone 215.

A roller 216 is installed inside the sleeve so as to roll on the path 214 when the drum 210 is driven in rotation. This roller is mounted loosely on a shaft the ends of which are guided by vertical slides or by levers and are subject to the action of hydropneumatic springs or jacks making it possible to press the roller on the grinding path with a predetermined and adjustable force. This traditional assembly is not represented in the drawings in order not to obscure them.

Several rollers arranged within the support angle β of the drum defined by the shoes 212 might be used. In the event that the drum is supported by a bearing, this angle is that of the range of the bearing.

At its end turned toward the intake of the mill, the roller 216 comprises a component of reduced diameter 217 which makes it possible to crush the large pieces which are found in the materials to be ground before they reach the layer of materials to be ground on which the principal part of the roller rolls and, consequently, to improve the homogeneity of this layer and the efficiency of the grinding.

Figure 9:
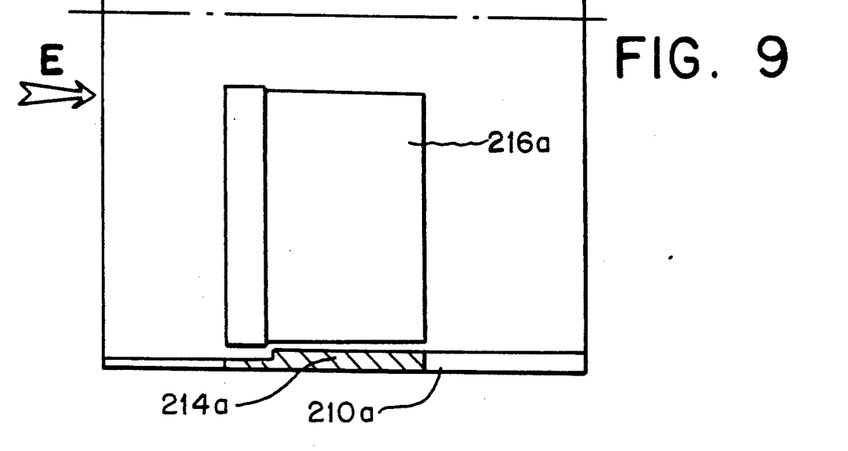
FIG. 9 to 11 are views in vertical section illustrating variants of implementation.
Figure 10:
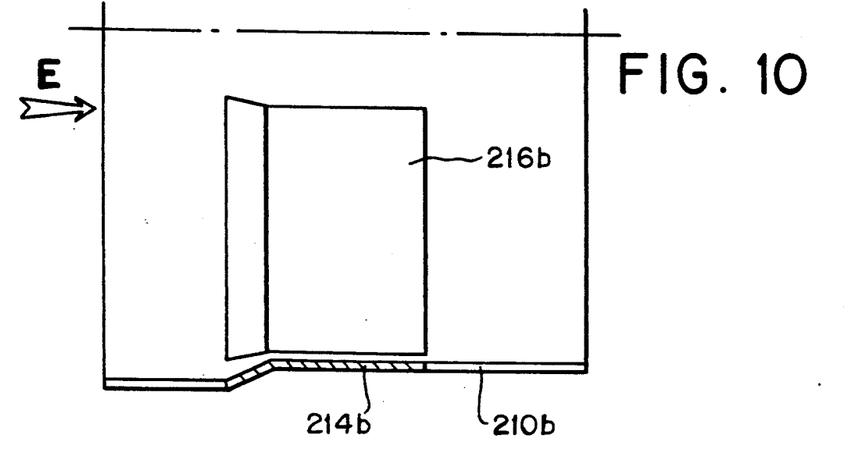
Figure 11:
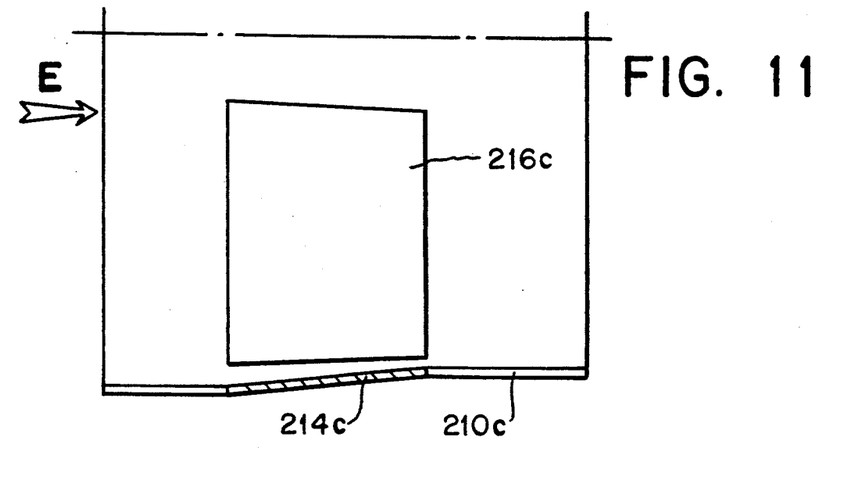

In the same spirit, in the case of materials with very heterogeneous granulometry, a systematic grinding might be accomplished by using a roller arranged in tiers made up of several components with increasing diameters from the intake toward the outlet or, at the limit, a roller in the shape of a truncated cone the small diameter of which would be at the intake side and the large diameter at the outlet side. The same result might be achieved by using a cylindrical roller and a grinding path which is in tiers or in the shape of a truncated cone with its largest diameter at the intake side and its small diameter at the outlet side. By using together a path and a roller which are arranged in tiers or in the shape of a truncated cone, having in each straight section, perpendicular to the axis of the mill, a constant relationship between the diameters of the path and the roller, the crushing of the large pieces and of the layer to be ground is performed without shearing or relative slipping which are wear factors for the work surfaces of the path and the roller. FIGS. 9 to 11 show three examples of application of this principle. In FIG. 9, the path 214a and the roller 216a each comprise two parts of different diameters, the part on the intake side of the mill having the largest diameter and an axial expanse clearly less than the other part; in the form of implementation in FIG. 10, the path 214b and the roller 216b each comprise a part in the shape of a truncated cone, on the intake side of the mill, and a cylindrical part of greater axial expanse; and FIG. 11 shows another form of implementation in which the path 214 c and the roller 216 c are in the shape of a truncated cone, their largest diameter being on the intake side of the mill. In these Figures, the arrow E indicates the direction of progression of the materials. It should be noted that this systematic grinding is possible only because of the step-by-step feed device which assures a progressive feed in the axial direction of the materials on the path.

In operation, the drum is driven in rotation in the direction of the arrow R, at a velocity higher than the critical velocity, so that all the material is centrifuged and caked on the inner surface of the drum, all over its circumference.

The device designed to assure the feed of the material, from one end of the drum to the other, is arranged in the upper half of the drum, in the descending portion of the circular trajectory of the materials.

This device is composed of a fixed scraper 218 extending over the entire length of the drum and held in contact with or in proximity to its inner surface, and deflector plates 220 arranged side by side, under the scraper, so as to intercept the flow of materials separated from the drum by the latter.

Each of the deflector plates is mounted on a support 222 so as to be able to pivot around a vertical axis 224, and a motor 226, such as a jack, to which the plate is connected by a rod 228, makes it possible to control its rotation around this axis.

Figure 7:
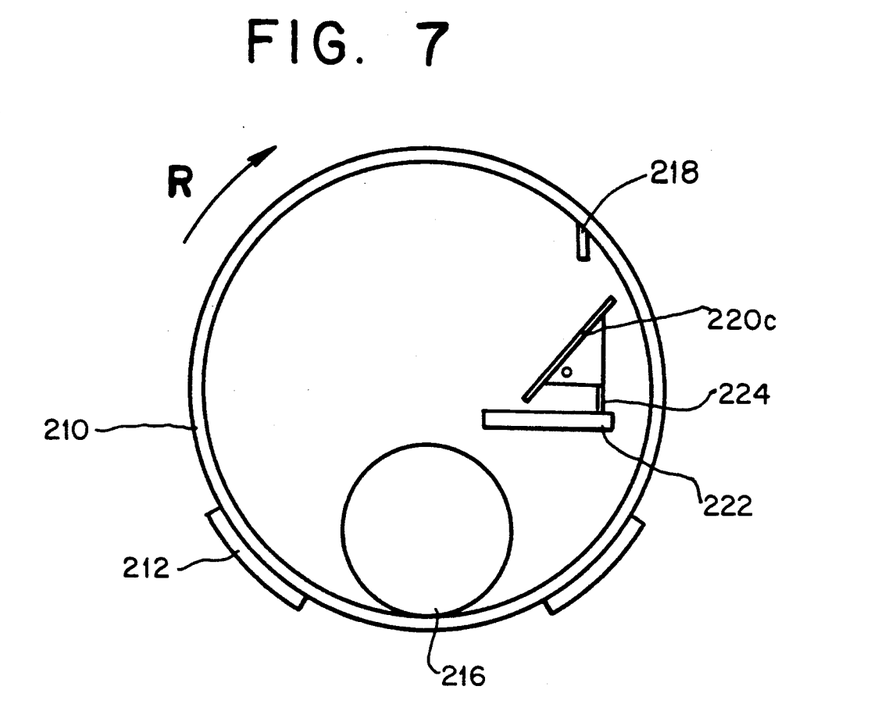
FIG. 7 is a view in the direction F of the mill of FIG. 5.
Figure 8:
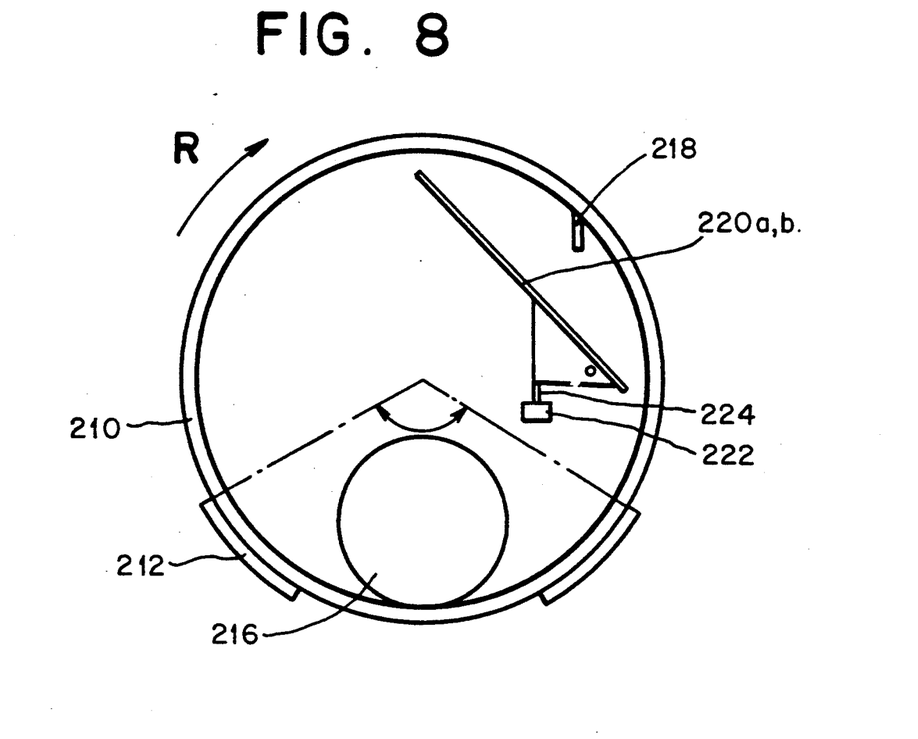
FIG. 8 is a section in the direction VIII—VIII of the mill of FIG. 5.

These plates are inclined approximately 45° and are arranged either as represented in FIG. 7 to divert the materials separated by the scraper toward the axis of the drum, or as represented in FIG. 8 to conduct the materials back toward the sleeve.

In the form of implementation represented in the drawing, the device comprises three deflector plates: a plate 220a arranged in the upper portion of the drum which constitutes the feed zone 211, a plate 220 b arranged in the central portion which constitutes the grinding zone 213, and a plate 220 c in the lower portion which constitutes the zone for removal of the ground materials 215. The plates 220a and 220b are arranged so as to return the materials separated by the scraper to the sleeve; the plate 220c is arranged so as to divert the materials toward the axis of the drum.

The number and the arrangement of the deflector plates might be different according to the dimensions of the mill and the results sought.

Figure 6:
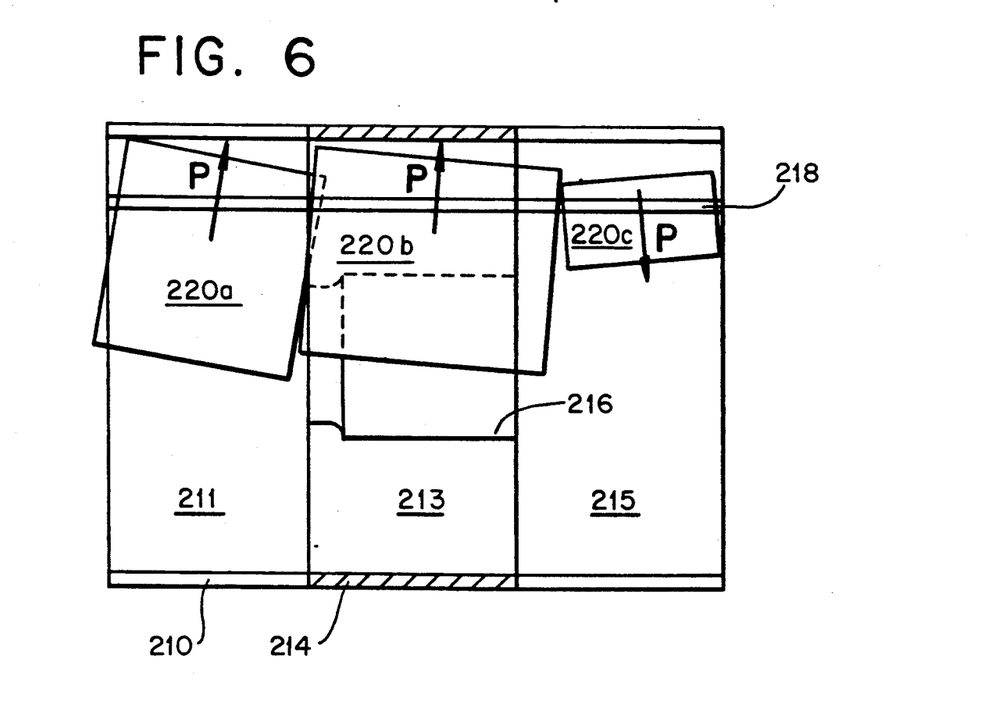
FIG. 6 is a schematic view, in plan, showing the positioning of the deflector plates.

FIG. 6 shows the positioning of the deflector plates. The materials separated from the drum by the scraper 218 fall on the plates and slide over the latter, along the lines of swiftest descent, in the direction of the arrows P. The materials thus feed at each turn of the drum in a direction parallel to its axis and at a distance which is a fraction of the width (axial expanse) of the path and which depends on the positioning of the deflector plates and is adjustable at will. The materials thus are conducted step-by-step from the point of introduction in the feed zone to the grinding path, then moved on the grinding path and finally removed at the desired velocity. As the positioning of the plates 220a, 220b and 220c is adjustable individually, it is possible to adopt different feed velocities in the three zones of the mill.

In the grinding zone, the feed at each turn of the drum represents a fraction of the width of the path, so that the materials undergo several grindings before being removed.

The adjustment of the positioning of the deflector plates may be remote-controlled and performed during the operation of the mill.

The following table makes it possible to compare the quality of a cement obtained by grinding of a clinker in a ring mill, in accordance with the invention, to that of a standard cement (Cement CPA 425 - 95% clinker, 5% gypsum) ground in the traditional manner in a plant equipped with a ball mill. It is noted that the invention makes it possible to obtain a cement of as high a quality with a specific energy consumption 40% lower than that of the ball mill.

| Type of mill | Specific energy Kwh/t | Fineness | | Manageability in % | Standard paste % water |
|---|---|---|---|---|---|
| | | % riddlings at 28μ | Blaine cm²/g | | |
| ball | 33 | 40.6 | 2,844 | 103 | 29 |
| ring | 20 | 35.6 | 2,880 | 96 | 28.6 |

| Type of mill | Resistance kg/cm² | | | | | | | |
|---|---|---|---|---|---|---|---|---|
| | Buckling | | | | Compression | | | |
| | 1 j | 3 j | 7 j | 28 j | 1 j | 3 j | 7 j | 28 j |
| ball | 31 | 54 | 68 | 89 | 130 | 250 | 343 | 520 |
| ring | 30 | 54 | 69 | 93 | 140 | 300 | 410 | 557 |

We claim:

1. A process for grinding a material, which comprises the steps of
   (a) providing a circular grinding path having a horizontal axis and two axially spaced edges,
   (b) feeding the material onto the circular grinding path adjacent one of the edges,
   (c) rotating the circular grinding path about the horizontal axis at a speed higher than a critical speed to form a continuous layer of the material on the path,
   (d) rolling a roller over the continuous layer of material on the rotating circular grinding path and exerting a pressure comprised between 10 MPa and 40 MPa on the material by the roller, and
   (e) moving the material transversely from the one edge of the circular grinding path to the other edge thereof and so controlling the transverse movement that the material is displaced only over a fraction of the distance between the edges during each rotation of the path and passes several times under the roller before leaving the grinding path over the other edge.

2. A mill for grinding a material, which comprises
   (a) a circular grinding path having a horizontal axis and two axially spaced edges,
   (b) means for feeding the material onto the circular grinding path adjacent one of the edges,
   (c) means for rotating the circular grinding path about the horizontal axis at a speed higher than a critical speed required to form a continuous layer of the material on the path,
   (d) a roller capable of rolling over the continuous layer of material on the rotating circular grinding path,
   (e) means for pressing the roller against the continuous layer of material on the rotating circular grinding path with a force sufficient to exert a pressure comprised between 10 MPa and 40 MPa on the material, and
   (f) means for controllably moving the material transversely from the one edge of the circular grinding path to the other edge thereof and so that the material is displaced only over a fraction of the distance between the edges during each rotation of the path and passes several times under the roller before leaving the grinding path over the other edge.

3. The grinding mill of claim 2, comprising a rotating ring having an inner surface defining the circular grinding path, the roller being placed inside the ring and arranged to roll on the inner ring surface.

4. The grinding mill of claim 3, wherein the means for controllably moving the material transversely from the one edge of the circular grinding path to the other edge thereof comprises a scraper extending in a direction parallel to the axis of the ring and penetrating into the layer of material held on the inner ring surface by centrifugal force to separate the layer of material from the inner ring surface, and deflector plates arranged under the scraper and apart therefrom so as to receive the separated material, the deflector plates being positioned so as to divert the separated material to the other edge and move the material in a direction parallel to the axis of the ring over a distance equal to a fraction of the axial distance between the edges.

5. The grinding mill of claim 4, wherein each deflector plate is pivotal about a substantially vertical axis for selectively inclining the deflector plate so as to divert the material toward the axis or toward the path.

6. The grinding mill of claim 5, further comprising means for controlling the pivoting of the deflector plates to change the positions thereof and thereby to adjust the axial feed velocity of the material.

7. The grinding mill of claim 3, wherein the roller has a diameter which increases in an axial direction whereby the space defined between the roller and the inner ring surface decreases from the one edge to the other edge.

8. The grinding mill of claim 3, wherein the circular grinding path has a diameter which increases progressively from the one to the other edge whereby the space defined between the roller and the inner ring surface decreases from the one edge to the other edge.

9. The grinding mill of claim 8, wherein the relationship between the diameters of the path and the roller remains constant throughout the axial length of the path and roller, in the same cross section of the mill.

10. The grinding mill of claim 3, further comprising a cylindrical sleeve, the ring being coaxially fastened to the sleeve and the sleeve forming on one side of the ring an intake chamber for the material, and the means for controllably moving the material transversely from the one edge of the circular grinding path to the other edge thereof extending into the intake chamber to move the material from the intake chamber onto the ring.

11. The grinding mill of claim 3, comprising two of said rollers placed angularly spaced inside the ring, the means for controllably moving the material transversely from the one edge of the circular grinding path to the other edge thereof being arranged upstream of each roller with reference to the direction of rotation of the ring.

12. The grinding mill of claim 3, further comprising support means for the ring, the support means being arranged beneath the roller.

13. The grinding mill of claim 12, wherein the support means comprises a bearing, further comprising a lubrication system maintaining a lubricating film of oil between the bearing and the rotating ring.

* * * * *